(12) United States Patent
Shpunt et al.

(10) Patent No.: US 9,063,283 B2
(45) Date of Patent: Jun. 23, 2015

(54) PATTERN GENERATION USING A DIFFRACTION PATTERN THAT IS A SPATIAL FOURIER TRANSFORM OF A RANDOM PATTERN

(71) Applicant: PRIMESENSE LTD., Tel Aviv (IL)

(72) Inventors: Alexander Shpunt, Tel Aviv (IL); Zeev Zalevsky, Rosh HaAyin (IL)

(73) Assignee: APPLE INC., Cupertino, CA (US)

( * ) Notice: Subject to any disclaimer, the term of this patent is extended or adjusted under 35 U.S.C. 154(b) by 207 days.

(21) Appl. No.: 13/748,617

(22) Filed: Jan. 24, 2013

(65) Prior Publication Data

US 2013/0136305 A1 May 30, 2013

Related U.S. Application Data

(63) Continuation of application No. 12/282,517, filed as application No. PCT/IL2007/000306 on Mar. 8, 2007, now Pat. No. 8,390,821, and a continuation-in-part of application No. PCT/IL2006/000335, filed on Mar. 14, 2006.

(60) Provisional application No. 60/785,187, filed on Mar. 24, 2006, provisional application No. 60/724,903, filed on Oct. 11, 2005.

(51) Int. Cl.
G02B 5/18 (2006.01)
G01B 11/25 (2006.01)
G06T 7/00 (2006.01)
G06K 9/00 (2006.01)

(52) U.S. Cl.
CPC ........ *G02B 5/18* (2013.01); *G01B 11/25* (2013.01); *G06T 7/0057* (2013.01); *G06K 9/00624* (2013.01)

(58) Field of Classification Search
CPC ...... G02B 27/0944; G02B 5/18; G02B 5/1842
See application file for complete search history.

(56) References Cited

U.S. PATENT DOCUMENTS

| | | | |
|---|---|---|---|
| 6,377,700 B1 | 4/2002 | Mack et al. | |
| 6,438,272 B1 | 8/2002 | Huang et al. | |
| 6,700,669 B1 | 3/2004 | Geng | |
| 7,560,679 B1 | 7/2009 | Gutierrez | |
| 7,811,825 B2 | 10/2010 | Fauver et al. | |
| 8,126,261 B2 | 2/2012 | Medioni et al. | |
| 8,326,025 B2 | 12/2012 | Boughorbel | |
| 2001/0012156 A1* | 8/2001 | Leigh-Jones et al. | 359/558 |

(Continued)

FOREIGN PATENT DOCUMENTS

JP 2000131040 A 5/2000

OTHER PUBLICATIONS

Japanese Patent Application No. 2011-517308 Office Action dated Jun. 19, 2013.

(Continued)

*Primary Examiner* — Hwa Lee
(74) *Attorney, Agent, or Firm* — D. Kligler I.P. Services Ltd.

(57) ABSTRACT

A diffractive optical element contains a diffraction pattern that is a spatial Fourier transform of a random pattern. The diffraction pattern may be etched or deposited on a surface of the diffractive optical element. Alternatively, a spatial light modulator (SLM) may be driven to project the diffraction pattern dynamically.

10 Claims, 4 Drawing Sheets

(56) References Cited

U.S. PATENT DOCUMENTS

| | | |
|---|---|---|
| 2004/0063235 A1 | 4/2004 | Chang |
| 2004/0264764 A1 | 12/2004 | Kochi et al. |
| 2005/0018209 A1 | 1/2005 | Lemelin et al. |
| 2005/0134582 A1 | 6/2005 | Claus et al. |
| 2005/0135555 A1 | 6/2005 | Claus et al. |
| 2006/0221250 A1 | 10/2006 | Rossbach et al. |
| 2007/0133840 A1 | 6/2007 | Cilia |
| 2007/0262985 A1 | 11/2007 | Watanabe et al. |
| 2008/0037829 A1 | 2/2008 | Givon |
| 2008/0118143 A1 | 5/2008 | Gordon et al. |
| 2008/0285827 A1 | 11/2008 | Meyer et al. |
| 2009/0046152 A1 | 2/2009 | Aman |
| 2009/0060307 A1 | 3/2009 | Ghanem et al. |
| 2009/0226079 A1 | 9/2009 | Katz et al. |
| 2009/0244309 A1 | 10/2009 | Maison et al. |
| 2010/0182406 A1 | 7/2010 | Benitez |
| 2010/0278384 A1 | 11/2010 | Shotton et al. |
| 2011/0001799 A1 | 1/2011 | Rothenberger et al. |
| 2011/0043403 A1 | 2/2011 | Loffler |
| 2011/0285910 A1 | 11/2011 | Bamji et al. |
| 2011/0310125 A1 | 12/2011 | Mceldowney et al. |
| 2012/0051588 A1 | 3/2012 | Mceldowney |

OTHER PUBLICATIONS

U.S. Appl. No. 13/036,023 Office Action dated Jul. 17, 2013.
U.S. Appl. No. 12/707,678 Office Action dated Jun. 20, 2013.
International Application PCT/IB2013/051189 Search Report dated Jun. 18, 2013.
U.S. Appl. No. 13/036,023 Office Action dated Sep. 3, 2013.
U.S. Appl. No. 12/844,864 Office Action dated Sep. 26, 2013.
U.S. Appl. No. 13/921,224 Office Action dated Oct. 3, 2013.
U.S. Appl. No. 12/958,427 Office Action dated Nov. 22, 2013.
Korean Patent Application No. 10-2008-7025030 Office Action dated Feb. 25, 2013.
U.S. Appl. No. 12/707,678 Office Action dated Feb. 26, 2013.
U.S. Appl. No. 12/758,047 Office Action dated Apr. 25, 2013.
U.S. Appl. No. 12/844,864 Office Action dated Apr. 11, 2013.
U.S. Appl. No. 13/541,775 Office Action dated Mar. 4, 2015.

* cited by examiner

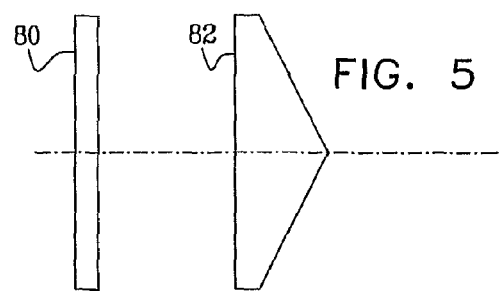
FIG. 5
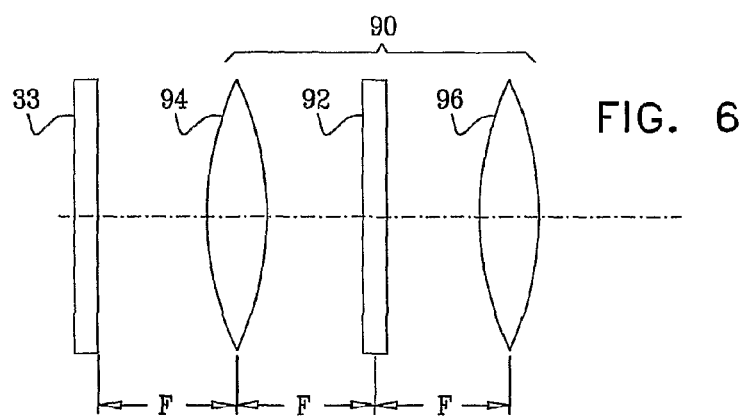
FIG. 6
FIG. 7
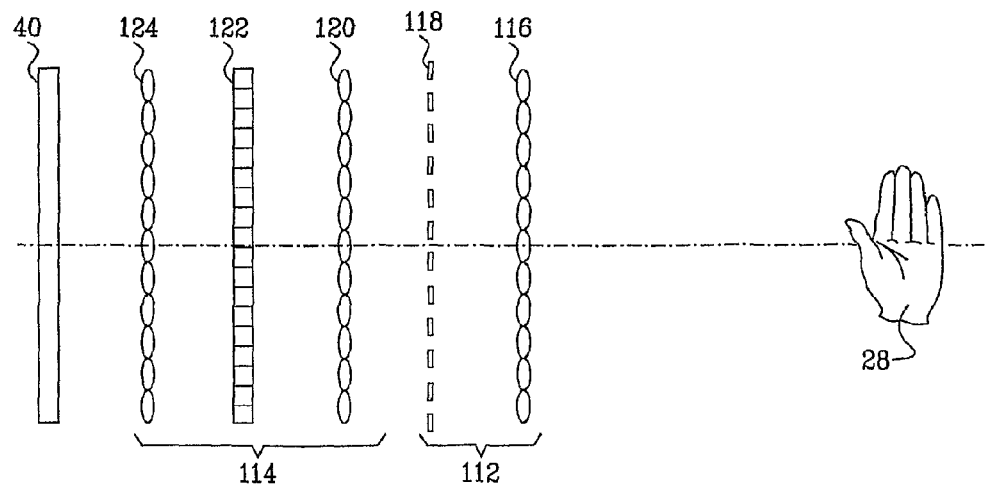

PATTERN GENERATION USING A DIFFRACTION PATTERN THAT IS A SPATIAL FOURIER TRANSFORM OF A RANDOM PATTERN

CROSS-REFERENCE TO RELATED APPLICATIONS

This application is a continuation of U.S. patent application Ser. No. 12/282,517, filed Oct. 30, 2008, in the national phase of PCT Patent Application PCT/IL2007/000306, filed Mar. 8, 2007, which claims the benefit of U.S. Provisional Patent Application 60/785,187, filed Mar. 24, 2006, and which is a continuation-in-part of PCT Patent Application PCT/IL2006/000335, filed Mar. 14, 2006, which claims the benefit of U.S. Provisional Patent Application 60/724,903, filed Oct. 11, 2005. All of these related applications are assigned to the assignee of the present patent application, and their disclosures are incorporated herein by reference.

FIELD OF THE INVENTION

The present invention relates generally to methods and systems for mapping of three-dimensional (3D) objects, and specifically to 3D optical imaging using speckle patterns.

BACKGROUND OF THE INVENTION

When a coherent beam of light passes through a diffuser and is projected onto a surface, a primary speckle pattern can be observed on the surface. The primary speckle is caused by interference among different components of the diffused beam. The term "primary speckle" is used in this sense in the present patent application and in the claims, in distinction to secondary speckle, which is caused by diffuse reflection of coherent light from the rough surface of an object Hart describes the use of a speckle pattern in a high-speed 3D imaging system, in Taiwanese Patent TW 527528 B and in U.S. patent application Ser. No. 09/616,606, whose disclosures are incorporated herein by reference. The system includes a single-lens camera subsystem with an active imaging element and CCD element, and a correlation processing subsystem. The active imaging element can be a rotating aperture which allows adjustable non-equilateral spacing between defocused images to achieve greater depth of field and higher sub-pixel displacement accuracy. A speckle pattern is projected onto an object, and images of the resulting pattern are acquired from multiple angles. The images are locally cross-correlated using an image correlation technique, and the surface is resolved by using relative camera position information to calculate the three-dimensional coordinates of each locally-correlated region.

Another speckle-based 3D imaging technique is described by Hunter et al., in U.S. Pat. No. 6,101,269, whose disclosure is incorporated herein by reference. A random speckle pattern is projected upon a 3D surface and is imaged by a plurality of cameras to obtain a plurality of two-dimensional digital images. The two-dimensional images are processed to obtain a three-dimensional characterization of the surface.

SUMMARY OF THE INVENTION

Embodiments of the present invention perform accurate, real-time mapping of 3D objects using primary speckle patterns. The methods and systems that are described in the above-mentioned PCT patent application, as well as further embodiments described hereinbelow, are capable of performing such 3D mapping using a single coherent light source and a single image sensor, which is held stationary at a fixed angle relative to the light source.

In one aspect of the invention, a reference image of the speckle pattern is captured initially on a reference surface of known profile. The 3D profile of an object is then determined by capturing an image of the speckle pattern projected on the object, and comparing the image to the reference image.

In another aspect of the invention, successive images of the speckle pattern on the object are captured as the object moves. Each image is compared with one or more of its predecessors in order to track the motion of the object in three dimensions. In one embodiment, which is described hereinbelow, the light source and image sensor are held in a linear alignment that permits rapid, accurate motion tracking by computing one-dimensional correlation coefficients between successive images.

In some embodiments, novel illumination and image processing schemes are used to enhance the accuracy, depth of field, and computational speed of the 3D mapping system.

There is therefore provided, in accordance with an embodiment of the present invention, apparatus for 3D mapping of an object, including:
an illumination assembly, including a coherent light source and a diffuser, which are arranged to project a primary speckle pattern on the object;
a single image capture assembly, which is arranged to capture images of the primary speckle pattern on the object from a single, fixed location and angle relative to the illumination assembly; and
a processor, which is coupled to process the images of the primary speckle pattern captured at the single, fixed angle so as to derive a 3D map of the object.

In some embodiments, the apparatus includes a mount, which is attached to the illumination assembly and the image capture assembly so as to hold the image capture assembly in a fixed spatial relation to the illumination assembly. In one embodiment, the image capture assembly includes an array of detector elements arranged in a rectilinear pattern defining first and second, mutually-perpendicular axes, and objective optics, which have an entrance pupil and are arranged to focus the image onto the array, wherein the illumination assembly and image capture assembly are aligned by the mount so as to define a device axis that is parallel to the first axis and passes through the entrance pupil and through a spot at which a beam emitted by the coherent light source passes through the diffuser. Thus, the processor is arranged to derive the 3D map by finding an offset along only the first axis between the primary speckle pattern captured in one or more of the images and a reference image of the primary speckle pattern.

In some embodiments, the processor is arranged to derive the 3D map by finding respective offsets between the primary speckle pattern on multiple areas of the object captured in one or more of the images and a reference image of the primary speckle pattern, wherein the respective offsets are indicative of respective distances between the areas and the image capture assembly. Typically, the image capture assembly is located at a predetermined spacing from the illumination assembly, and the respective offsets are proportional to the respective distances in a ratio that is determined by the spacing. In a disclosed embodiment, the primary speckle pattern projected by the illumination assembly includes speckles having a characteristic size, and the size of the speckles in the images varies across the image by a tolerance that depends on the spacing, wherein the spacing is selected so as to maintain the tolerance within a predefined bound.

Additionally or alternatively, the processor is arranged to relate the respective offsets to respective coordinates in the 3D map using a parametric model of distortion in the image capture assembly. Further additionally or alternatively, the processor is arranged to find the respective offsets by finding an initial match between the primary speckle pattern in a first area of the object and a corresponding area of the reference image at a first offset relative to the first area, and to apply a region growing procedure, based on the first offset, to find the respective offsets of pixels adjacent to the first area.

In a disclosed embodiment, the processor is arranged to process a succession of the images captured while the object is moving so as to map a 3D movement of the object, wherein the object is a part of a human body, and wherein the 3D movement includes a gesture made by the part of the human body, and wherein the processor is coupled to provide an input to a computer application responsively to the gesture.

In some embodiments, the illumination assembly includes a beam former, which is arranged to reduce a variation of a contrast of the speckle pattern created by the diffuser over a sensing volume of the apparatus. In one embodiment, the beam former includes a diffractive optical element (DOE) and a lens arranged to define a Fourier plane of the diffuser, wherein the DOE is located in the Fourier plane. The beam former may be arranged to reduce a divergence of light emitted from the diffuser or to equalize an intensity of light emitted from the diffuser across a plane transverse to an optical axis of the illumination assembly.

In one embodiment, the processor includes an optical correlator, the optical correlator includes a diffractive optical element (DOE) containing a reference speckle pattern, and the image capture assembly includes a lenslet array, which is arranged to project multiple sub-images of the object onto the DOE so as to generate respective correlation peaks that are indicative of 3D coordinates of the object.

In some embodiments, the coherent light source has a coherence length that is less than 1 cm. Additionally or alternatively, the primary speckle pattern includes speckles having a characteristic size, and the illumination assembly is configured so as to permit the characteristic size of the speckles to be adjusted by varying a distance between the coherent light source and the diffuser.

There is also provided, in accordance with an embodiment of the present invention, a method for 3D mapping of an object, including:

illuminating an object with a beam of diffused coherent light from a light source so as to project a primary speckle pattern on the object;

capturing images of the primary speckle pattern on the object from a single, fixed location and angle relative to the light source; and processing the images of the primary speckle pattern captured at the single, fixed angle so as to derive a 3D map of the object.

There is additionally provided, in accordance with an embodiment of the present invention, apparatus for 3D mapping of an object, including:

an illumination assembly, including a coherent light source, having a coherence length less than 1 cm, and a diffuser, which are arranged to project a primary speckle pattern on the object;

an image capture assembly, which is arranged to capture images of the primary speckle pattern on the object; and a processor, which is coupled to process the images of the primary speckle pattern so as to derive a 3D map of the object.

In one embodiment, the coherence length of the coherent light source is less than 0.5 mm. Additionally or alternatively, the coherent light source has a divergence greater than 5°.

The present invention will be more fully understood from the following detailed description of the embodiments thereof, taken together with the drawings in which:

BRIEF DESCRIPTION OF THE DRAWINGS

FIG. 5 is a schematic side view of a beam former, in accordance with an embodiment of the present invention;

FIG. 6 is a schematic side view of a beam former, in accordance with yet another embodiment of the present invention; and FIG. 7 is a schematic side view of an optical correlator used in a system for 3D mapping, in accordance with a further embodiment of the present invention.

DETAILED DESCRIPTION OF EMBODIMENTS

Figure 1:
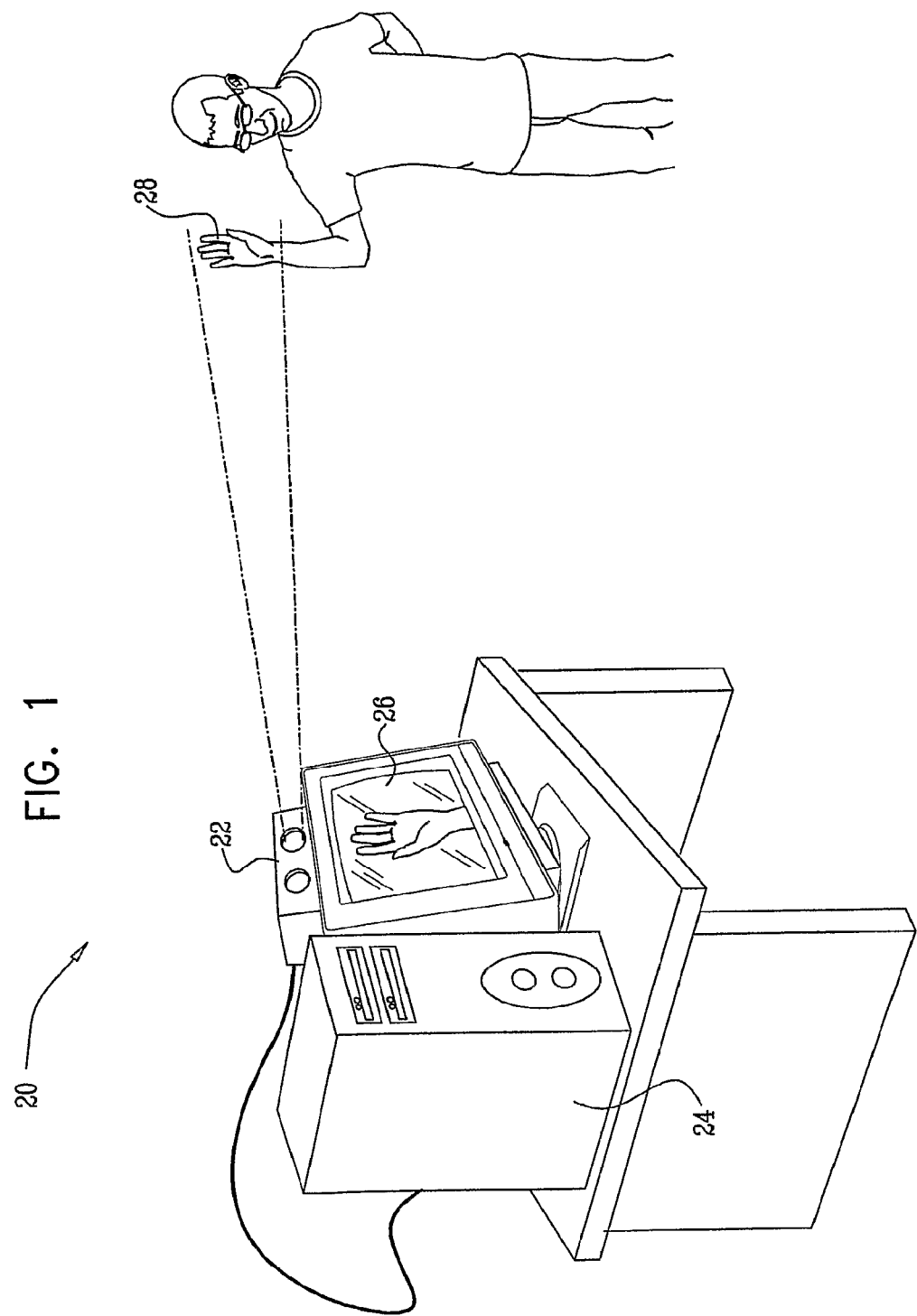
FIG. 1 is a schematic, pictorial illustration of a system for 3D mapping, in accordance with an embodiment of the present invention.

FIG. 1 is a schematic, pictorial illustration of a system 20 for 3D mapping, in accordance with an embodiment of the present invention. System 20 comprises a speckle imaging device 22, which generates and projects a primary speckle pattern onto an object 28 and captures an image of the primary speckle pattern appearing on the object. Details of the design and operation of device 22 are shown in the figures that follow and are described hereinbelow with reference thereto.

An image processor 24 processes image data generated by device 22 in order to derive a 3D map of object 28. The term "3D map," as used in the present patent application and in the claims, refers to a set of 3D coordinates representing the surface of an object. The derivation of such a map based on image data may also be referred to as "3D reconstruction." Image processor 24, which performs such reconstruction, may comprise a general-purpose computer processor, which is programmed in software to carry out the functions described hereinbelow. The software may be downloaded to processor 24 in electronic form, over a network, for example, or it may alternatively be provided on tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although processor 24 is shown in FIG. 1, by way of example, as a separate unit from imaging device 22, some or all of the processing functions of processor 24 may be performed by suitable dedicated circuitry within the housing of the imaging device or otherwise associated with the imaging device.

The 3D map that is generated by processor 24 may be used for a wide range of different purposes. For example, the map may be sent to an output device, such as a display 26, which shows a pseudo-3D image of the object. In the example shown in FIG. 1, object 28 comprises all or a part (such as a hand) of the body of a subject. In this case, system 20 may be used to provide a gesture-based user interface, in which user movements detected by means of device 22 control an interactive computer application, such as a game, in place of tactile interface elements such as a mouse, joystick or other accessory. Alternatively, system 20 may be used to create 3D maps of objects of other types, for substantially any application in which 3D coordinate profiles are needed.

Figure 2:
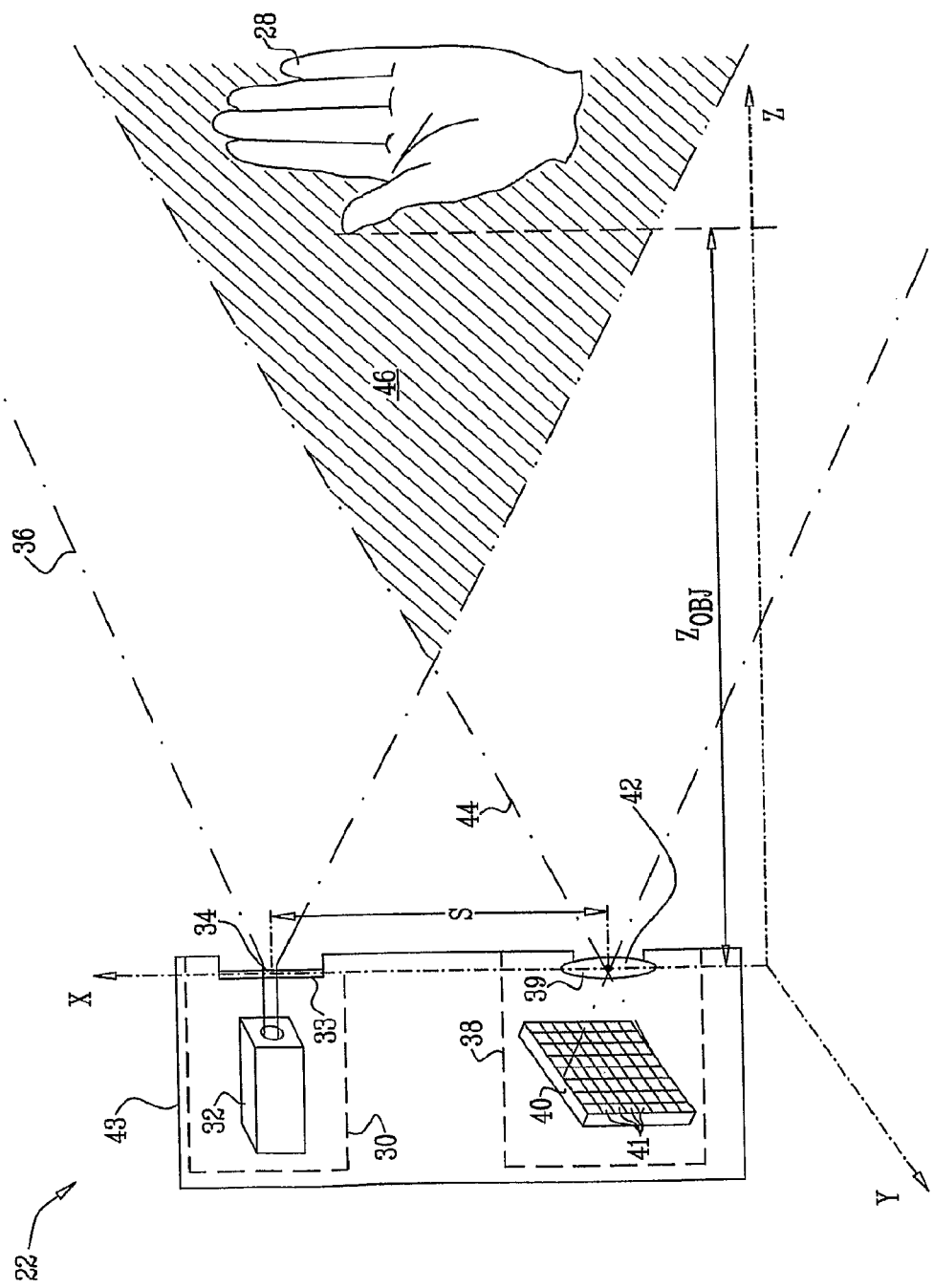
FIG. 2 is a schematic top view of a speckle imaging device, in accordance with an embodiment of the present invention.

FIG. 2 is a schematic top view of device 22, in accordance with an embodiment of the present invention. An illumination assembly 30 comprises a coherent light source 32, typically a laser, and a diffuser 33. (The term "light" in the context of the present patent application refers to any sort of optical radiation, including infrared and ultraviolet, as well as visible light.) The beam of light emitted by source 32 passes through diffuser 33 at a spot 34 of radius $w_0$, and thus generates a diverging beam 36. As explained in the above-mentioned PCT Patent Application PCT/IL2006/000335, the primary speckle patterns created by diffuser 34 at distances $Z_{obj1}$ and $Z_{obj2}$ are to a good approximation linearly-scaled versions of one another, as long as $Z_{obj1}$ and $Z_{obj2}$ are within a range of distances given by the axial size of the speckle pattern $\Delta Z$ at the object distance $Z_{obj}$, $$\Delta Z = \left(\frac{Z_{obj}}{w_0}\right)^2 \lambda.$$

An image capture assembly 38 captures an image of the speckle pattern that is projected onto object 28. Assembly 38 comprises objective optics 39, which focus the image onto an image sensor 40. Typically, sensor 40 comprises a rectilinear array of detector elements 41, such as a CCD or CMOS-based image sensor array. Optics 39 have an entrance pupil 42, which together with the dimensions of the image sensor defines a field of view 44 of the image capture assembly. The sensing volume of device 22 comprises an overlap area 46 between beam 36 and field of view 44.

The characteristic transverse speckle size projected by illumination assembly 30 (as defined by the second-order statistics of the speckle pattern) at a distance $Z_{obj}$ is $$\Delta X = \frac{Z_{obj}}{w_0} \lambda.$$

The inventors have found that for optimal image processing performance, the size of the speckles imaged onto sensor 40 should be between one and ten pixels, depending on range and resolution requirements, i.e., each speckle imaged onto sensor 40 by optics 39 should span between one and ten detector elements 41 in the horizontal direction. In typical applications, a speckle size between two and three pixels gives good results.

It can be seen from the formula above for $\Delta X$ that the speckle size may be adjusted by varying the distance between light source 32 and diffuser 33, since the radius $w_0$ of spot 34 increases with distance from the light source. Thus, the speckle parameters of illumination assembly 30 can be controlled simply by laterally shifting the light source, without the use of lenses or other optics. Illumination assembly 30 can be adjusted in this manner to work with image sensors of different size and resolution and with objective optics of varying magnification. Given the small speckle size that is mandated by the above parameters, an inexpensive light source, such as a laser diode, with high divergence (5° or greater) and short coherence length (less than 1 cm, and in some cases even shorter than 0.5 mm) may be used in system 20 with good effect.

Illumination assembly 30 and image capture assembly 38 are held in a fixed spatial relation by a mount 43. In the embodiment shown in FIG. 2, the mount comprises a housing that holds the assemblies. Alternatively, any other suitable sort of mechanical mount may be used to maintain the desired spatial relation between the illumination and image capture assemblies. The configuration of device 22 and the processing techniques described hereinbelow make it possible to perform 3D mapping using the single image capture assembly, without relative movement between the illumination and image capture assemblies and without moving parts. Image capture assembly 38 thus captures images at a single, fixed angle relative to illumination assembly 30.

To simplify the computation of the 3D map and of changes in the map due to motion of object 28, as described hereinbelow, it is desirable that mount 43 hold assemblies 30 and 38 so that the axis passing through the centers of entrance pupil 42 and spot 34 is parallel to one of the axes of sensor 40. In other words, taking the rows and columns of the array of detector elements 41 to define mutually-perpendicular X- and Y-axes (with the origin on the optical axis of objective optics 39), the axis passing through pupil 42 and spot 34 should be parallel to one of the array axes, which is taken for convenience to be the X-axis. The advantages of this arrangement are explained further hereinbelow.

The respective optical axes of assemblies 30 and 38 (which pass through the centers of spot 34 and pupil 42, respectively) are separated by a distance S. Therefore, variations in $Z_{obj}$ will cause distortions of the speckle pattern in images of the object captured by image capture assembly 38. Specifically, by triangulation, it can be seen in FIG. 2 that a Z-direction shift of a point on the object, $\delta Z$, will engender a concomitant transverse shift $\delta X$ in the speckle pattern observed in the image, such that $$\delta X \cong \delta Z \frac{S}{Z_{obj}}.$$

Z-coordinates of points on the object, as well as shifts in the Z-coordinates over time, may thus be determined by measuring shifts in the X-coordinates of the speckles in the image captured by assembly 38 relative to a reference image taken at a known distance Z. In other words, the group of speckles in each area of the captured image are compared to the reference image to find the most closely-matching group of speckles in the reference image. The relative shift between the matching groups of speckles in the image gives the Z-direction shift of the area of the captured image relative to the reference image. The shift in the speckle pattern may be measured using image correlation or other image matching computation methods that are known in the art. Some exemplary methods are described in the above-mentioned PCT patent application. Another method that is particularly useful in conjunction with device 22 is described in U.S. Provisional Patent Application 60/785,202, filed Mar. 24, 2006, which is assigned to the assignee of the present patent application and whose disclosure is incorporated herein by reference.

Furthermore, in the arrangement shown in FIG. 2, in which the X-axis passing through pupil 42 and spot 34 is parallel to the X-axis of sensor 40, the shift of the speckle pattern with $\delta Z$ will be strictly in the X-direction, with no Y-component of the shift (as long as distortion due to optics 39 is negligible).

Therefore, the image matching computation is simplified and need only seek the closest matching group of speckles subject to X-shift. In other words, to determine δZ of an area in the current image relative to a reference image (which may be any previous image of the speckle pattern), it is necessary only to check X-shifted copies of areas of the current image against the reference image in order to find the value of the shift δX that gives the best match to the reference image.

Alternatively, if the geometrical alignment of the elements of device 22 deviates from the above criteria, or if lens distortions are significant, processor may use a parametric model to compensate for the deviation. In other words, the known deviation may be measured or otherwise modeled, and the processor may then check copies of areas of the current image that are shifted by appropriate (X,Y) shifts relative to the reference image according to the parametric model of the deviation in order to find the actual 3D coordinates of the object surface.

Typically, for convenience of construction and computation, the operating parameters of system 20 are chosen so that $S \ll Z_{obj}$. (On the other hand, since the Z-direction resolution of system 20 depends on the ratio $S/Z_{obj}$, S must be large enough, relative to the intended working distance of the system, so that the desired resolution can be achieved.) As long as $S \ll Z_{obj}$, the respective distances from the illumination and image capture assemblies to each object point are close, but generally not exactly equal. Therefore, the scale of the speckles in the images of the speckle pattern that are captured by assembly 38 will vary across area 46 by some tolerance γ. Computational methods known in the art, some of which are described in the above-mentioned PCT patent application, may be used to compensate for these scale variations in matching areas of the current image to corresponding areas of the reference image.

In general, however, to avoid placing too great a computational load on processor 24, it is desirable that γ be maintained within some predetermined bound, depending on the matching window size, as well as on the characteristic speckle size. Generally, the inventors have found that γ should be limited so that scaling of a characteristic window varies by no more than about 30% of a single speckle size. Given a diagonal angle θ of the field of view of the image capture assembly 38, $$\gamma \cong 1 \pm \frac{S \cdot \sin(\theta)}{2 \cdot Z_{obj}}.$$

Therefore, substantial scale invariance of the local speckle pattern for window of size N is obtained when $$\frac{S \cdot \sin(\theta) \cdot N}{2 \cdot Z_{obj}} < 0.3 \frac{\lambda Z_{obj}}{w_0 \cdot psize(Z_{obj})},$$

wherein $psize(Z_{obj})$ is the size of the pixel at $Z_{obj}$. Under these conditions, the Z-direction shifts of the object in successive image frames captured by assembly 38 can generally be computed without explicitly taking speckle scaling variations into account.

Figure 3:
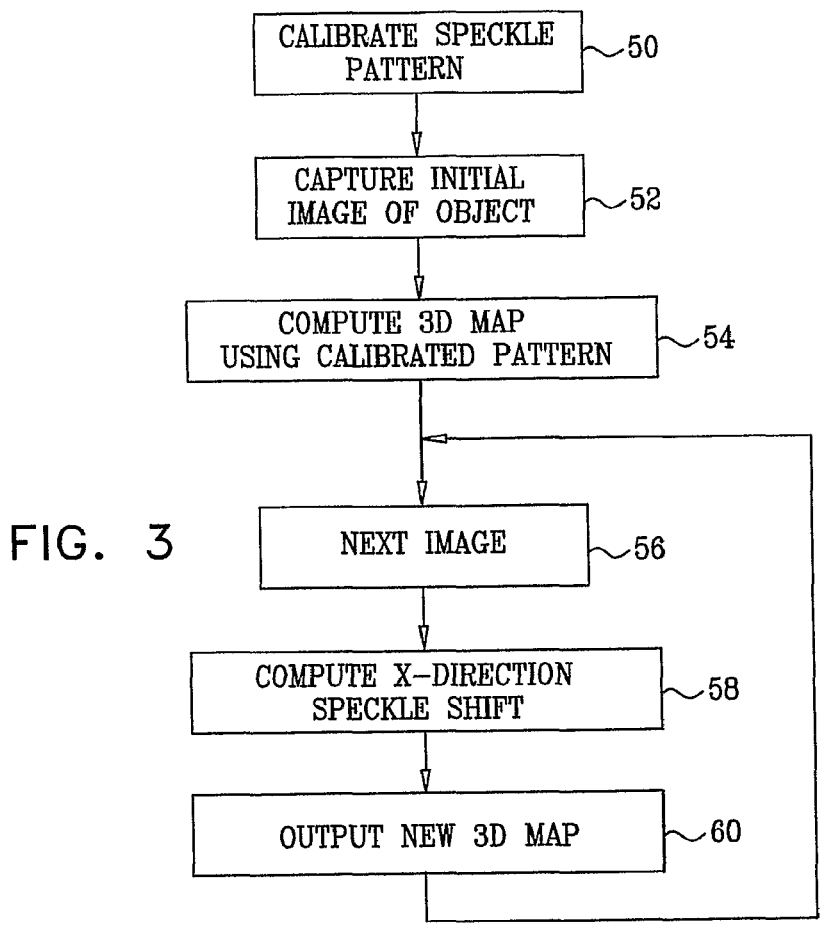
FIG. 3 is a flow chart that schematically illustrates a method for 3D mapping, in accordance with an embodiment of the present invention.

FIG. 3 is a flow chart that schematically illustrates a method for 3D mapping using system 20, in accordance with an embodiment of the present invention. This method is based, inter alia, on the realization that the speckle pattern that is projected by illumination assembly 30 does not change substantially over time. Therefore, an individual image of the speckle pattern that is projected onto an object, captured by image capture assembly 38 at a fixed location and angle relative to assembly, may be used to accurately compute a 3D map of the object.

Before mapping an object, device 22 is calibrated by projecting the speckle pattern from assembly 30 onto an object of known spatial profile at a known distance from the device, at a calibration step 50. Typically, a planar object extending across area 46 at a known distance $Z_{obj}$ is used as a calibration target for this purpose. Image capture assembly 38 captures a reference image of the object, which is stored in a memory of processor 24. This calibration step may be carried out at the time of manufacture, and the reference image stored in the memory will then be usable in the field as long as there is no uncontrolled relative motion among the different components of device 22. To save memory and simplify subsequent computation, the reference image may be saved in a data-reduced form, such as a threshold-based binary image, that is appropriate for the matching algorithm that is to be used.

When system 20 is ready for use, it is actuated to capture an image of the object of interest (object 28 in this example) using device 22, at an initial image capture step 52. Processor 24 compares this image to the speckle pattern in the stored calibration image, at a map computation step 54. Dark areas of the image, in which the pixel values are below some threshold value (or otherwise not containing relevant speckle information), are typically classified as shadow areas, from which depth (Z) information cannot be derived. The remainder of the image may be binarized, possibly using an adaptive threshold, as is known in the art, or otherwise data-reduced for efficient matching to the reference image.

Processor 24 selects a certain window within the non-shadow part of the image, and compares the sub-image within the window to parts of the reference image until the part of the reference image that best matches the sub-image is found. When assemblies 30 and 38 are aligned along the X-axis, as described above and shown in FIG. 2, it is sufficient for processor to compare the sub-image to parts of the reference image that are displaced in the X-direction relative to the sub-image (subject to scaling of the speckle pattern by up to the scaling factor γ, as noted above). The processor uses the transverse offset of the sub-image relative to the matching part of the reference image to determine the Z-coordinate of the area of the surface of object 28 within the sub-image, based on the principle of triangulation explained above. If this area of the object surface is slanted, rather than being oriented in an X-Y plane, then the speckle pattern in the sub-image will exhibit distortion. Processor 24 may optionally analyze the speckle distortion in order to estimate the slant angle, and thus improve the accuracy of 3D mapping.

Processor 24 may use the map coordinates of this first window as a start point for determining the coordinates of neighboring areas of the image. Specifically, once the processor has found a high correlation between a certain area in the image and a corresponding area in the reference image, the offset of this area relative to the reference image can serve as a good predictor of the offsets of neighboring pixels in the image. The processor attempts to match these neighboring pixels to the reference image with an offset equal to or within a small range of the initially-matched area. In this manner, the processor grows the region of the matched area until it reaches the edges of the region. The processor thus proceeds to determine the Z-coordinates of all non-shadow areas of the image, until it has completed the 3D profile of object 28. This approach has the advantage of providing fast, robust matching even using small windows and images with poor signal/ noise ratio. Details of computational methods that may be used for this purpose are described in the above-mentioned PCT patent application.

At the conclusion of the above steps, processor 24 will have computed a complete 3D map of the part of the object surface that is visible in the initial image. The method may readily be extended, however, to capture and analyze successive images in order to track 3D motion of the object, at a next image step 56. Device 22 captures the successive images at some predetermined frame rate, and processor 24 updates the 3D map based on each successive image. The 3D maps may be computed with respect to the stored, calibrated reference image if desired. Alternatively, since the object will generally not move too much from one image frame to the next, it is frequently more efficient to use each successive image as a reference image for the next frame.

Thus, processor 24 may compare each successive image to the preceding image in order to compute the X-direction shift of the speckles in each sub-image relative to the same speckles in the preceding image, at a shift computation step 58. Typically, the shift is no more than a few pixels, so that the computation can be performed rapidly and efficiently. After each new image is processed in this manner, processor 24 outputs the updated 3D map, at a new map output step 60. This process of image capture and update may thus proceed indefinitely. Because of the ease of computation of successive 3D maps, system 20 is capable of operating and outputting map coordinates at real-time video rates, on the order of 30 frames/sec or even faster, while using simple, low-cost imaging and processing hardware. Furthermore, efficient image matching computation and region growing, as described above, may enable system 20 to operate at video speed even when local shifts cannot be computed from preceding images.

These capabilities of system 20 make it suitable for use in a wide range of applications, and particularly in implementing machine interfaces based on human gestures. In such an interface, a computer (which may comprise processor 24 or may receive the 3D maps output by the processor) identifies a certain volume or volumes in the 3D maps that correspond to parts of the user's body, such as the arm, hand, and/or fingers, and possibly the head, torso, and other extremities, as well. The computer is programmed to identify gestures corresponding to certain Movements of these body parts and to control computer applications in response to these gestures. Examples of such gestures and applications include:

Mouse translation and clicking—The computer interprets motion of the user's hand and fingers as though the user were moving a mouse on a table and clicking the mouse buttons.

Freehand pointing to, selection and translation of objects on the computer screen.

Computer games, in which user gestures may hit, grasp, move and release real or virtual objects used in the game.

Computer interface for handicapped users, based on sensing a limited range of motions that the user is capable of making.

Typing on a virtual keyboard.

Other applications will be apparent to those skilled in the art.

Returning now to FIG. 2, as beam 36 spreads beyond the Rayleigh distance, the intensity of illumination falling on object 28 drops in approximate proportion to $Z^2$. The contrast of the speckle pattern projected on the object will drop accordingly, particularly when there is strong ambient light at the wavelength of source 32. The range of depth (Z-coordinates) over which system 20 provides useful results may thus be limited on account of weak illumination at large Z. This limitation may be mitigated by methods of adaptive control and image processing, as are known in the art. Some suitable methods of this sort are described in the above mentioned PCT Patent Application PCT/IL2006/000335. Alternatively or additionally, optical beam forming may be applied to improve the illumination profile, as described hereinbelow.

Figure 4:
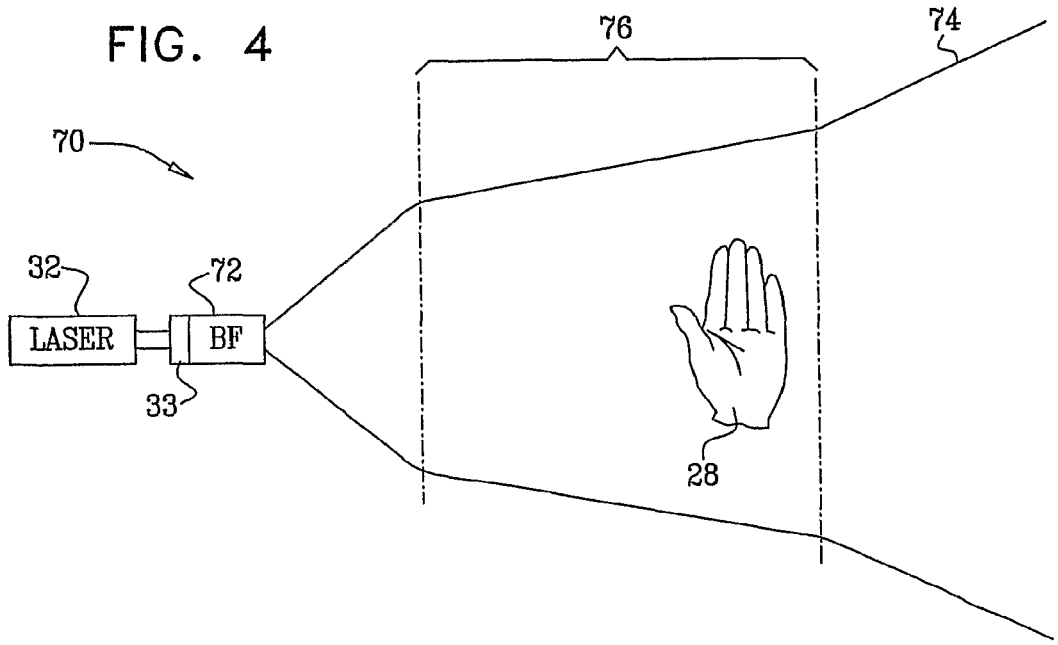
FIG. 4 is a schematic side view of an illumination assembly used in a system for 3D mapping, in accordance with another embodiment of the present invention.

FIG. 4 is a schematic side view of an illumination assembly 70 that may be used in system 20 in order to enhance the useful depth range of the system, in accordance with an embodiment of the present invention. Assembly 70 comprises source 32 and diffuser 33, together with a beam former 72. The beam former is designed to create beam 74 having reduced divergence over an intermediate region 76, while still preserving the linear scaling of the speckle pattern with axial distance Z within this region. As a result, high speckle contrast is maintained in images of object 28 throughout region 76, so that the range of depths covered by the 3D mapping system is increased. A number of optical designs that may be used to achieve this enhanced performed in region 76 are described below.

FIG. 5 is a schematic side view of beam former 72, in accordance with an embodiment of the present invention. The beam former comprises a diffractive optical element (DOE) 80 and an axicon 82. DOE 80 may be butted against diffuser 33, or even incorporated as an etched or deposited layer on the surface of the diffuser itself. Various diffractive designs may be used to reduce the beam divergence in region 76. For example, DOE 80 may comprise a pattern of concentric rings, centered on the optical axis of source 32, with a random distribution of ring radii. Axicon 82 has a conical profile centered on the optical axis, i.e., it is a sort of rotationally-symmetrical prism. Both DOE 80 and axicon 82 have the effect of creating long regions of focus along the optical axis, so that either of these elements could be used alone to create a region of reduced beam divergence. The reduction of divergence can be further enhanced by using the two elements together.

FIG. 6 is a schematic side view of a beam former 90, in accordance with another embodiment of the present invention. Beam former 90 comprises a DOE 92 and lenses 94 and 96, having focal length F. As shown in the figure, the lenses are separated from diffuser 33 and from DOE 92 by distances equal to their focal lengths, so that the DOE is located in the Fourier plane of the diffuser. Thus, the Fourier transform of the diffuser is multiplied by the transmission function of the DOE. In the far field, the speckle pattern is multiplied by the Fourier transform of the pattern on the DOE.

The DOE pattern may be chosen so that its Fourier transform provides reduced divergence, as shown above in FIG. 4, and/or more uniform illumination across the illumination beam. The latter object can be achieved by designing element 92 with lower transmittance in its central region than in the periphery (opposite to the angular intensity distribution of the beam from diffuser 33, which tends to be brighter in the center and fall off with increasing angle from the optical axis). Other designs of DOE 92 or DOE 80 (FIG. 5) for the purposes of achieving more uniform speckle contrast over the volume of interest will be apparent to those skilled in the art and are considered to be within the scope of the present invention.

FIG. 7 is a schematic side view of an optical correlator 110 that may be used in system 20 to determine Z-coordinates of areas of object 28, in accordance with an embodiment of the present invention. Correlator 110, in other words, uses optical techniques to carry out some of the functions of processor 24 that were described above. The correlator is capable of determining coordinates of multiple areas of the object in parallel at very high speed, almost instantaneously. It is therefore useful particularly in applications that are characterized by rapid object motion.

A lenslet array 116 forms multiple sub-images of object 28 under speckle illumination by assembly 30. An array 118 of apertures limits the fields of view of the lenslets in array 116, so that each sub-image contains light from only a narrow angular range. A second lenslet array 120 projects the sub-images onto a DOE 122. Array 120 is separated from the plane of the sub-images by a distance equal to the focal length of the lenslets in the array, and is separated from the plane of DOE 122 by an equal distance. A rear lenslet array 124 is located between DOE 122 and sensor 40, separated from each by a distance equal to the focal length of the lenslets.

DOE 122 contains a reference diffraction pattern that is the spatial Fourier transform of the reference speckle pattern to which the speckle image of object 28 is to be compared. For example, the reference diffraction pattern may be the Fourier transform of the calibration speckle image formed at step 50 (FIG. 3), using a flat surface at a known distance from the illumination source. In this case, the reference diffraction pattern may be deposited or etched on the surface of the DOE. Alternatively, DOE 122 may comprise a spatial light modulator (SLM), which is driven to project the reference diffraction pattern dynamically.

In either case, correlator 110 multiplies the sub-images of the object (formed by the lenslets in array 116) by the reference speckle pattern in Fourier space. Therefore, the intensity distribution projected onto sensor 40 by lenslet array 124 corresponds to the cross-correlation of each sub-image with the reference speckle pattern. In general, the intensity distribution on the sensor will comprise multiple correlation peaks, each peak corresponding to one of the sub-images. The transverse offset of each peak relative to the axis of the corresponding sub-image (as defined by the corresponding aperture in array 118) is proportional to the transverse displacement of the speckle pattern on the corresponding area of object 28. This displacement, in turn, is proportional to the Z-direction displacement of the area relative to the plane of the reference speckle pattern, as explained above. Thus, the output of sensor 40 may be processed to determine the Z-coordinate of the area of each sub-image, and thus to compute a 3D map of the object.

Although the embodiments described above relate to the specific configuration of system 20 and design of device 22 that are described above, certain principles of the present invention may similarly be applied in systems and devices of other types for speckle-based 3D mapping. For example, aspects of the embodiments described above may be applied in systems in that use multiple image capture assemblies, or in which the image capture assembly and the illumination assembly are movable relative to one another.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A diffractive optical element, containing a diffraction pattern that is a spatial Fourier transform of a random pattern.

2. The diffractive optical element according to claim 1, wherein the diffraction pattern is etched on a surface of the diffractive optical element.

3. The diffractive optical element according to claim 1, wherein the diffraction pattern is deposited on a surface of the diffractive optical element.

4. The diffractive optical element according to claim 1, comprising a spatial light modulator (SLM), which is driven to project the diffraction pattern dynamically.

5. An optical method, comprising:
    defining a random pattern; and
    providing a diffractive optical element containing a diffraction pattern that is a spatial Fourier transform of the random pattern.

6. The method according to claim 5, wherein providing the diffractive optical element comprises etching the diffraction pattern on a surface of the diffractive optical element.

7. The method according to claim 5, wherein providing the diffractive optical element comprises depositing the diffraction pattern on a surface of the diffractive optical element.

8. The method according to claim 5, wherein providing the diffractive optical element comprises driving a spatial light modulator (SLM) to project the diffraction pattern dynamically.

9. The method according to claim 5, and comprising projecting the random pattern onto an object, and processing an image of the random pattern on the object in order to derive a three-dimensional (3D) map of the object.

10. A method for three-dimensional (3D) mapping, comprising:
    providing a diffractive optical element containing a diffraction pattern that is a spatial Fourier transform of a random pattern; and
    using the diffractive optical element, generating a 3D map of an object by projecting the random pattern onto the object, and processing an image of the random pattern on the object.

* * * * *